US012533890B2

(12) United States Patent
Kawakita et al.

(10) Patent No.: US 12,533,890 B2
(45) Date of Patent: Jan. 27, 2026

(54) LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

(71) Applicant: BROTHER KOGYO KABUSHIKI KAISHA, Nagoya (JP)

(72) Inventors: Akihiro Kawakita, Nagoya (JP); Hisaaki Yoshimoto, Nukata (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 164 days.

(21) Appl. No.: 18/521,464

(22) Filed: Nov. 28, 2023

(65) Prior Publication Data

US 2024/0173992 A1 May 30, 2024

(30) Foreign Application Priority Data

Nov. 30, 2022 (JP) ................................ 2022-191862

(51) Int. Cl.
*B41J 2/175* (2006.01)
*B41J 2/18* (2006.01)

(52) U.S. Cl.
CPC ........... *B41J 2/17566* (2013.01); *B41J 2/175* (2013.01); *B41J 2/17523* (2013.01); *B41J 2/17596* (2013.01); *B41J 2/18* (2013.01)

(58) Field of Classification Search
CPC .... B41J 2/17566; B41J 2/175; B41J 2/17523; B41J 2/17596; B41J 2/18; B41J 2/17509; B41J 29/38
See application file for complete search history.

(56) References Cited

U.S. PATENT DOCUMENTS

2024/0278581 A1* 8/2024 Endo .................... B41J 2/17596

FOREIGN PATENT DOCUMENTS

JP 2004314392 A 11/2004

* cited by examiner

*Primary Examiner* — Justin Seo
(74) *Attorney, Agent, or Firm* — K&L Gates LLP

(57) ABSTRACT

A liquid supply system supplies a liquid from a server tank to a printer tank via a tube by a liquid delivery mechanism. A processor of the liquid supply system causes the liquid delivery mechanism to perform a supply and return operations. A first tank is one of the server tank or the printer tank. A second tank is different from the first tank, of the server tank and the printer tank. The processor causes the liquid delivery mechanism to perform a liquid delivery operation before the supply and return operations, when a remaining amount of the liquid in the first tank becomes equal to or greater than a first prescribed remaining amount. The liquid delivery operation is the supply or return operation of delivering the liquid from the first tank to the second tank via the tube.

10 Claims, 8 Drawing Sheets

LIQUID SUPPLY SYSTEM, CONTROL METHOD, NON-TRANSITORY COMPUTER-READABLE MEDIUM STORING COMPUTER-READABLE INSTRUCTIONS, AND LIQUID SUPPLY DEVICE

REFERENCE TO RELATED APPLICATIONS

This application claims priority from Japanese Patent Application No. 2022-191862 filed on Nov. 30, 2022. The entire content of the priority application is incorporated herein by reference.

BACKGROUND ART

A liquid supply system that supplies a liquid to a printer is known. The liquid supply system is provided with a main tank and the printer. Ink is stored in the main tank as one type of the liquid. The printer is provided with a sub tank. The sub tank is connected to the main tank via a main tank tube. The liquid supply system supplies the ink from the main tank to the sub tank via the main tank tube.

DESCRIPTION

In the above-described liquid supply system, in order to cause a state of the ink, such as a temperature distribution, a density distribution and the like, to be uniform, it is conceivable to circulate the ink between the main tank and the sub tank via the main tank tube. In this case, there is a possibility that an amount of the ink in the main tank after the circulation changes from an amount of the ink in the main tank before the circulation, and an amount of the ink in the sub tank after the circulation changes from an amount of the ink in the sub tank before the circulation. Thus, if the amount of ink in the main tank continues to increase as a result of the circulation being repeatedly performed, there is a possibility that ink may overflow from the main tank. If the amount of ink in the sub tank continues to increase as a result of the circulation being repeatedly performed, there is a possibility that the ink may overflow from the sub tank.

Embodiments of the broad principles derived herein provide a liquid supply system, a control method, a non-transitory computer-readable medium storing computer-readable instructions, and a liquid supply device that contribute to suppressing a liquid from overflowing from a tank.

A first aspect of the present disclosure relates to a liquid supply system supplying a liquid to a printer tank. The printer tank is a tank provided in a printer. The liquid supply system includes a tube, a liquid delivery mechanism, a processor, and a memory. The tube connects the printer tank and a server tank configured to store the liquid. The liquid delivery mechanism is provided in the tube, and is configured to perform a supply operation of supplying the liquid from the server tank to the printer tank via the tube, and a return operation of returning the liquid from the printer tank to the server tank via the tube. The memory stores computer-readable instructions that, when executed by the processor, cause the processor to perform processes. The processes include circulation processing of causing the liquid delivery mechanism to perform the supply operation and the return operation, and first liquid delivery processing of, when a remaining amount of the liquid in a first tank becomes equal to or greater than a first prescribed remaining amount, causing the liquid delivery mechanism to perform a liquid delivery operation before the circulation processing. The first tank is one of the server tank or the printer tank. The liquid delivery operation is the supply operation or the return operation of delivering the liquid from the first tank to a second tank via the tube. The second tank is, of the server tank and the printer tank, different from the first tank.

According to the first aspect, when the remaining amount of the liquid in the first tank becomes equal to or greater than the first prescribed remaining amount, before the circulation processing, the liquid is delivered from the first tank to the second tank by the first liquid delivery processing. In this way, the remaining amount of the liquid in the first tank decreases. Thus, even when the circulation processing is subsequently performed, the liquid is suppressed from overflowing from the first tank. As a result, the processor contributes to suppressing the liquid from overflowing from the first tank.

A second aspect of the present disclosure relates to a control method by a liquid supply system supplying a liquid to a printer tank. The printer tank is a tank provided in a printer. The liquid supply system includes a tube and a liquid delivery mechanism. The tube connects the printer tank and a server tank configured to store the liquid. The liquid delivery mechanism is provided in the tube. The liquid delivery mechanism is configured to perform a supply operation of supplying the liquid from the server tank to the printer tank via the tube, and a return operation of returning the liquid from the printer tank to the server tank via the tube. The control method includes circulation processing of causing the liquid delivery mechanism to perform the supply operation and the return operation, and first liquid delivery processing of, when a remaining amount of the liquid in a first tank becomes equal to or greater than a first prescribed remaining amount, causing the liquid delivery mechanism to perform a liquid delivery operation before the circulation processing. The first tank is one of the server tank or the printer tank. The liquid delivery operation is the supply operation or the return operation of delivering the liquid from the first tank to a second tank via the tube. The second tank is, of the server tank and the printer tank, different from the first tank.

The second aspect contributes to the seme advantage as the first aspect.

A third aspect of the present disclosure relates to a non-transitory computer-readable medium storing computer-readable instructions executed by a computer of a liquid supply system supplying a liquid to a printer tank. The printer tank is a tank provided in a printer. The liquid supply system includes a tube and a liquid delivery mechanism. The tube connects the printer tank and a server tank configured to store the liquid. The liquid delivery mechanism is provided in the tube. The liquid delivery mechanism is configured to perform a supply operation of supplying the liquid from the server tank to the printer tank via the tube, and a return operation of returning the liquid from the printer tank to the server tank via the tube. The instructions, when executed by the computer, causes the computer to perform processes. The processes includes circulation processing of causing the liquid delivery mechanism to perform the supply operation and the return operation, and first liquid delivery processing of, when a remaining amount of the liquid in a first tank becomes equal to or greater than a first prescribed remaining amount, causing the liquid delivery mechanism to perform a liquid delivery operation before the circulation processing. The first tank is one of the server tank or the printer tank. The liquid delivery operation is the supply operation or the return operation of delivering the liquid from the first tank to a second tank via the tube. The second tank is, of the server tank and the printer tank, different from the first tank.

The third aspect contributes to the seme advantage as the first aspect.

A fourth aspect of the present disclosure relates to a liquid supply device supplying a liquid to a printer tank. The printer tank is a tank provided in a printer. The liquid supply device includes a tube, a liquid delivery mechanism, a processor, and a memory. The tube connects the printer tank and a server tank configured to store the liquid. The liquid delivery mechanism is provided in the tube, and is configured to perform a supply operation of supplying the liquid from the server tank to the printer tank via the tube, and a return operation of returning the liquid from the printer tank to the server tank via the tube. The memory stores computer-readable instructions that, when executed by the processor, cause the processor to perform processes. The processes include circulation processing of causing the liquid delivery mechanism to perform the supply operation and the return operation, and first liquid delivery processing of, when a remaining amount of the liquid in a first tank becomes equal to or greater than a first prescribed remaining amount, causing the liquid delivery mechanism to perform a liquid delivery operation before the circulation processing. The first tank is one of the server tank or the printer tank. The liquid delivery operation is the supply operation or the return operation of delivering the liquid from the first tank to a second tank via the tube. The second tank is, of the server tank and the printer tank, different from the first tank.

The fourth aspect contributes to the seme advantage as the first aspect.

OVERALL CONFIGURATION OF LIQUID SUPPLY SYSTEM 100

Figure 1:
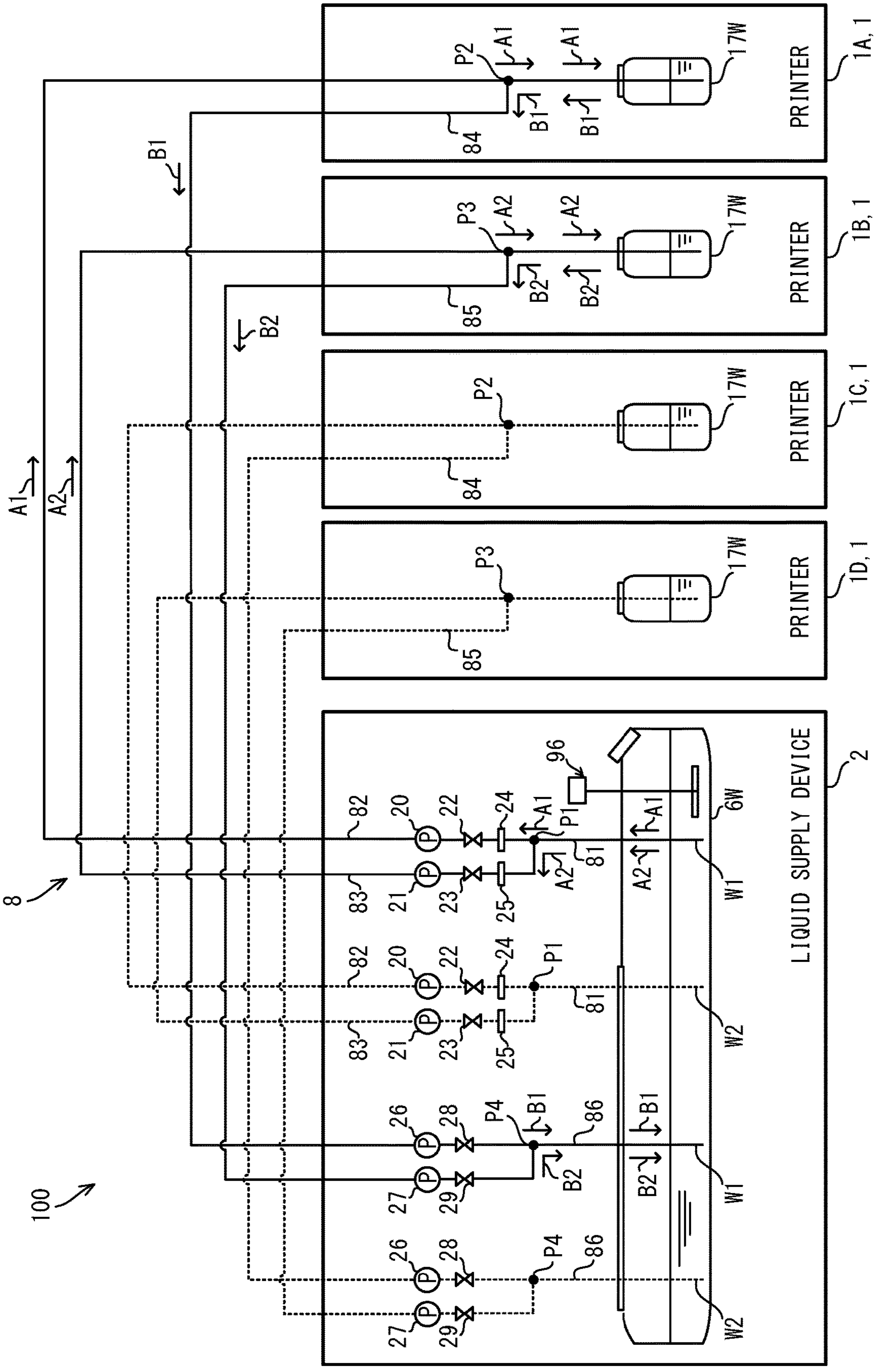
FIG. 1 is a flow path configuration diagram of a liquid supply system.

A liquid supply system 100 according to an embodiment of the present disclosure will be described with reference to the appended drawings. As shown in FIG. 1, the liquid supply system 100 includes a plurality of printers 1, and a liquid supply device 2. The liquid supply system 100 supplies an ink, for example, as a liquid, to each of the plurality of printers 1, from the liquid supply device 2.

A number of the plurality of printers 1 is not limited to a particular number, and, for example, four printers 1A, 1B, 1C, and 1D are connected to the single liquid supply device 2. The printer 1 is an inkjet printer, for example, and performs printing by ejecting the ink onto a print medium (not shown in the drawings). The print medium is a cloth, paper, or the like, and is a T-shirt, for example.

The ink is, for example, white (W), black (K), yellow (Y), cyan (C), or magenta (M). Hereinafter, of the five colors of the ink, the white color ink will be referred to as "white ink," and when the four colors of the black, cyan, yellow and magenta inks are collectively referred to, or when one of the inks is not particularly specified, they will be referred to as "color inks."

The white ink is used in printing as a portion representing white in an image, or as a base for the color inks. The color inks are ejected directly onto the print medium, or onto the base created using the white ink, and are used in printing of a color image.

<Mechanical Configuration of Printer 1>

Figure 2:
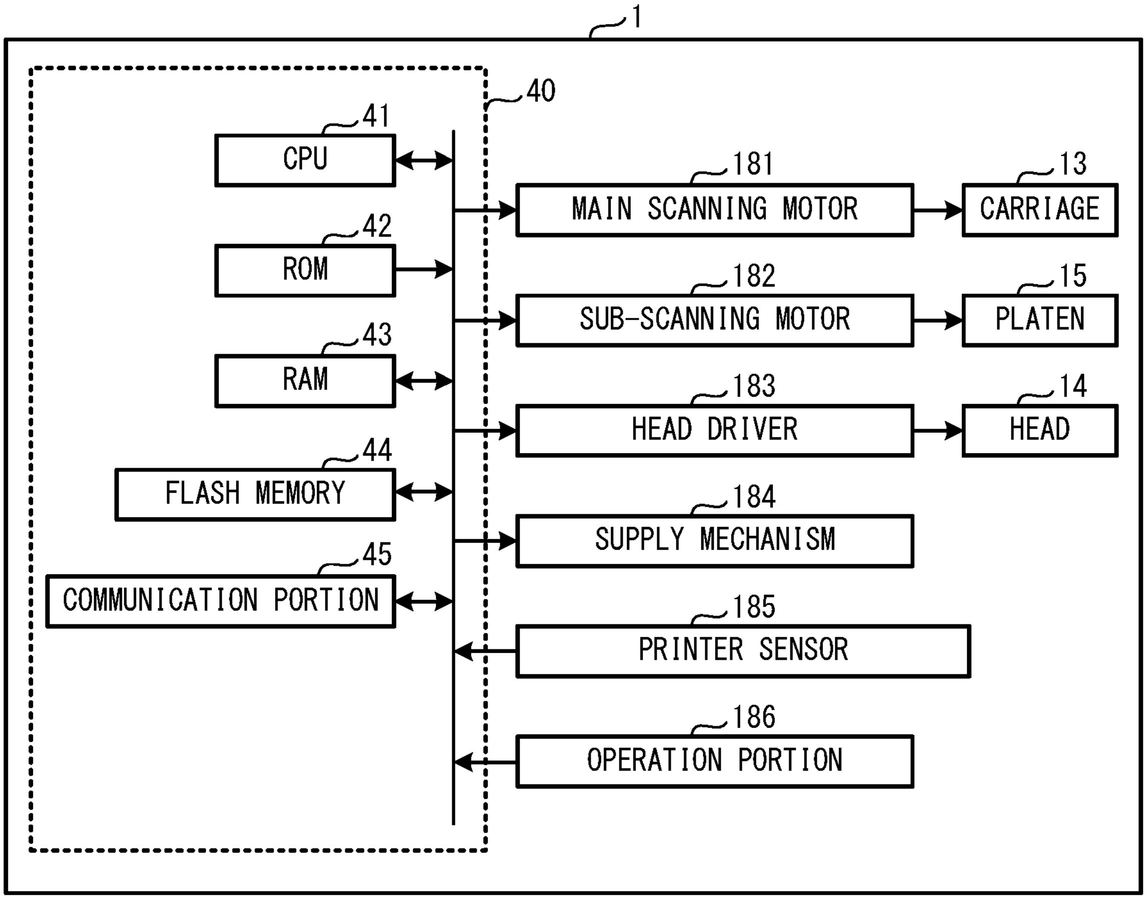
FIG. 2 is a block diagram showing an electrical configuration of a printer.

The printer 1 is provided with a platen 15, a carriage 13, and a head 14 shown in FIG. 2. The platen 15 is provided to be moveable in a sub-scanning direction. The print medium is placed on the platen 15. The carriage 13 is provided to be movable in a main scanning direction. The main scanning direction is orthogonal to the sub-scanning direction.

The head 14 is mounted to the carriage 13, and moves together with the carriage 13 in the main scanning direction. The head 14 includes nozzles and ejects white ink from the nozzles onto the print medium on the platen 15. In addition to the head 14, the printer 1 is provided with a head or a plurality of heads (hereinafter referred to as the "other heads"). In the present embodiment, the other heads are not shown in the drawings, and a description thereof is simplified. The other heads are different from the head 14 in that the other heads eject the color inks, rather than the white ink, from the nozzles onto the print medium on the platen 15.

The printer 1 is provided with a printer tank 17W. The printer tank 17W receives the supply of the white ink from the liquid supply device 2, and stores the supplied white ink. The printer tank 17W is connected to the head 14 shown in FIG. 2, via a tube (not shown in the drawings).

In addition to the printer tank 17W, the printer 1 is provided with a plurality of printer tanks (hereinafter referred to as "other printer tanks"). In the present embodiment, the other printer tanks are not shown in the drawings, and a description thereof is simplified. The other printer tanks differ from the printer tank 17W in that the other printer tanks receive the supply of the color inks from the liquid supply device 2, in place of the white ink. The other printer tanks are connected to the other heads via tubes (not shown in the drawings).

The white ink is supplied from the printer tank 17W to the head 14 shown in FIG. 2 via the tube (not shown in the drawings), by the driving of a supply mechanism 184 shown in FIG. 2. Similarly, the color inks are supplied to the other heads from the other printer tanks. The carriage 13 moves in the main scanning direction as a result of the driving of a main scanning motor 181 shown in FIG. 2. The platen 15 moves in the sub-scanning direction as the result of the driving of a sub-scanning motor 182 shown in FIG. 2. In this way, the head 14 moves in the main scanning direction and the sub-scanning direction relative to the print medium on the platen 15.

While the head 14 moves in the main scanning direction and the sub-scanning direction relative to the print medium on the platen 15, the head 14 ejects the white ink from the nozzles onto the print medium on the platen 15 as a result of the driving of a head driver 183 shown in FIG. 2. Similarly, the other heads eject the color inks from the nozzles onto the print medium on the platen 15. As a result of the above, the printer 1 performs print processing of printing on the print medium.

<Mechanical Configuration of Liquid Supply Device 2>

The liquid supply device 2 is provided with a server tank 6W, tubes 8, and an agitation mechanism 96. The server tank 6W is positioned outside the plurality of printers 1, and stores the white ink. A capacity of the white ink that can be stored by the server tank 6W is greater than a capacity of the white ink that can be stored by the single printer tank 17W, and is greater than a total of the capacities of the white ink that can be stored by the printer tanks 17W of the printers 1A, 1B, 1C, and 1D. The tubes 8 configure flow paths of the white ink between the server tank 6W and the respective printer tanks 17W of the plurality of printers 1.

Figure 3:
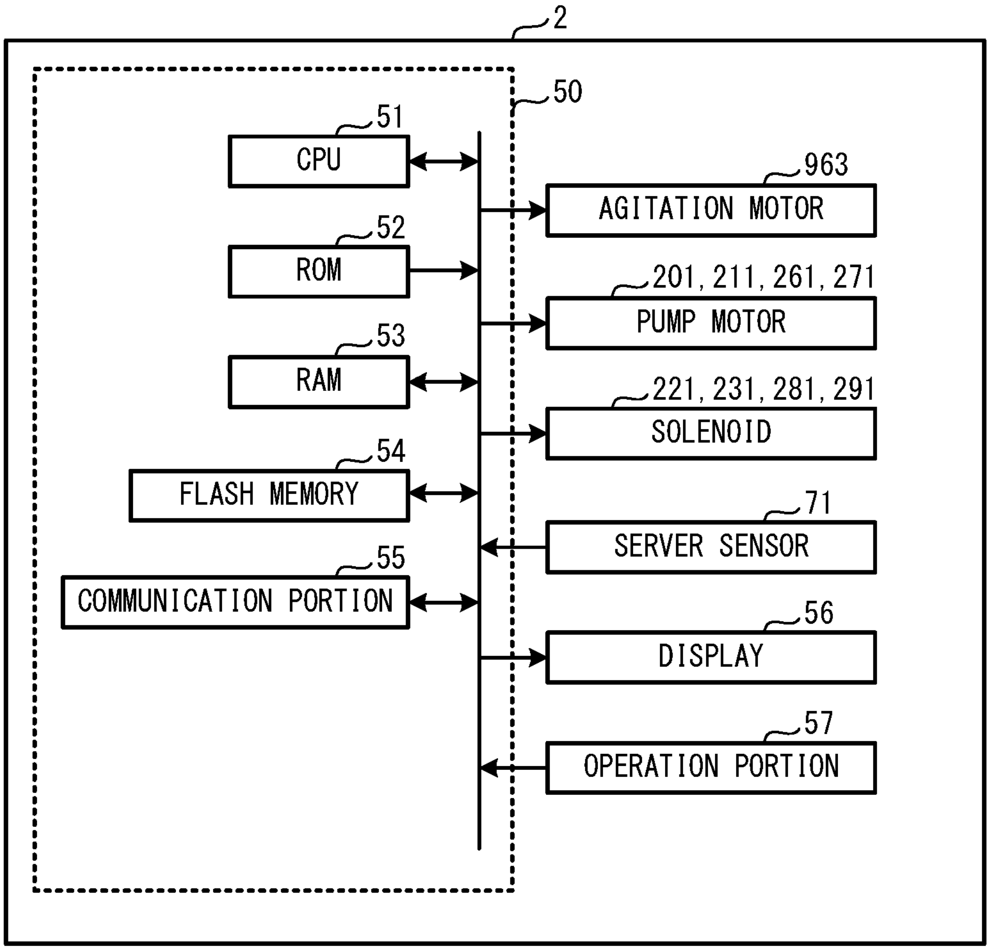
FIG. 3 is a block diagram showing an electrical configuration of the liquid supply device.

The agitation mechanism 96 is a propeller stirrer, for example, and performs an agitation operation of agitating the white ink inside the server tank 6W, as a result of the driving of an agitation motor 963 shown in FIG. 3. In the present embodiment, the white ink includes, as solid components such as pigment particles and the like, components that are more prone to settling than components included in the color inks. The component prone to settling is titanium oxide, for example. The titanium oxide is a type of inorganic pigment having a relatively high specific gravity. Since the white ink includes the component that is relatively prone to settling, the pigment particles and the like in the white ink easily precipitate as the solid components. Hereinafter, the precipitation of the solid components in the white ink will also be referred to as "settling of the white ink." By performing the agitation operation, the agitation mechanism 96 suppresses the settling of the white ink inside the server tank 6W.

Note that, in addition to the server tank 6W, the liquid supply device 2 is provided with a plurality of server tanks (hereinafter referred to as "other server tanks") and, in addition to the tubes 8, is provided with a plurality of tubes (hereinafter referred to as "other tubes"). In the present embodiment, the other server tanks and the other tubes are not shown in the drawings, and a description thereof is simplified.

The other server tanks differ from the server tank 6W in that the other server tanks store the color inks rather than the white ink. The other tubes configure flow paths of the color inks between the other server tanks and respective other printer tanks of the plurality of printers 1. The other tubes differ from the tube 8 in that the other tubes are not provided with tubes 84, 85, and 86 to be described later. Note that in the present embodiment, the agitation mechanism 96 is not provided in the other server tanks.

<Flow Path Configuration of White Ink>

A flow path of the white ink includes a first white flow path W1 and a second white flow path W2. Note that FIG. 1 shows the first white flow path W1 using solid lines and shows the second white flow path W2 using dotted lines. The first white flow path W1 connects the server tank 6W and the respective printer tanks 17W of the printers 1A and 1B to each other. The second white flow path W2 connects the server tank 6W and the respective printer tanks 17W of the printers 1C and 1D to each other.

The first white flow path W1 and the second white flow path W2 differ from each other in whether the connection destination from the liquid supply device 2 is one of the printers 1A and 1, or the printers 1C and 1D. Thus, hereinafter, the first white flow path W1 will be described and, for the second white flow path W2, the same reference signs will be assigned as for the first white flow path W1 and the description thereof will be omitted or simplified.

The first white flow path W1 is configured by tubes 81, tubes 82 and 83, and tubes 84, 85, and 86 as the tubes 8. The tube 81 is connected to the server tank 6W. The tube 81 extends from inside the server tank 6W to a point P1. The tube 81 is connected to the tube 82 and the tube 83 at the point P1.

The tube 82 extends from the point P1 toward the printer tank 17W of the printer 1A via a point P2, and is connected to the printer tank 17W of the printer 1A. The tube 83 extends from the point P1 toward the printer 1B via a point P3, and is connected to the printer tank 17W of the printer 1B.

The tube 84 is connected to the tube 82 at the point P2. The tube 84 extends from the point P2 to a point P4, and is connected to the tube 86 at the point P4. The tube 85 is connected to the tube 83 at the point P3. The tube 85 extends from the point P3 to the point P4, and is connected to the tube 86 at the point P4. The tube 86 extends from the point P4 toward the server tank 6W, and is connected to the server tank 6W.

Hereinafter, the flow path from the server tank 6W to the printer tank 17W of the printer 1A via the tube 81 and the tube 82, and the flow path from the server tank 6W to the printer tank 17W of the printer 1B via the tube 81 and the tube 83 will be respectively referred to as a "supply flow path." The side of the server tank 6W in the supply flow path will be referred to as "upstream in the supply flow path," and the side of the printer tank 17W of the printer 1A or the printer 1B will be referred to as "downstream in the supply flow path." For example, at a halfway point in the supply flow path, the side of the server tank 6W is upstream in the supply flow path and the side of the printer tank 17W of the printer 1A or the printer 1B is downstream in the supply flow path.

The flow path from the printer tank 17W of the printer 1A to the server tank 6W via the tube 84 and the tube 86, and the flow path from the printer tank 17W of the printer 1B to the server tank 6W via the tube 85 and the tube 86 will be respectively referred to as a "circulation flow path." The side of the printer tank 17W of the printer 1A or the printer 1B in the circulation flow path will be referred to as "upstream in the circulation flow path," and the side of the server tank 6W will be referred to as "downstream in the circulation flow path." For example, at a halfway point in the circulation flow path, the side of the printer tank 17W of the printer 1A or the printer 1B is upstream in the circulation flow path and the side of the server tank 6W is downstream in the circulation flow path.

A supply pump 20, a supply valve 22, and a filter 24 are provided in the tube 82. A supply pump 21, a supply valve 23, and a filter 25 are provided in the tube 83. The supply pump 20 is positioned further upstream in the supply flow path than the point P2. The supply pump 21 is positioned further upstream in the supply flow path than the point P3.

As a result of being respectively driven by pump motors 201 and 211 shown in FIG. 3, the supply pumps 20 and 21 suck up the white ink from the server tank 6W via the tube 81. As a result of being driven by the pump motor 201 shown in FIG. 3, the supply pump 20 sends the sucked up white ink toward the printer tank 17W of the printer 1A, via the tube 82. As a result of being driven by the pump motor 211 shown in FIG. 3, the supply pump 21 sends the sucked up white ink toward the printer tank 17W of the printer 1, via the tube 83.

Hereinafter, a state in which a valve is closed will be referred to as a "closed state," and a state in which valve is open will be referred to as an "open state." In the closed state, the valve causes the flow path to be in a blocked state. In the open state, the valve causes the flow path to be in a communicated state.

The supply valve 22 is positioned further upstream in the supply flow path than the supply pump 20. The supply valve 23 is positioned further upstream in the supply flow path than the supply pump 21. The supply valves 22 and 23 switch between the closed state and the open state as a result of being driven by solenoids 221 and 231 shown in FIG. 3, respectively. In the closed state, the supply valve 22 causes the tube 82 to be in the blocked state, and in the open state, causes the tube 82 to be in the communicated state. In the closed state, the supply valve 23 causes the tube 83 to be in the blocked state, and in the open state, causes the tube 83 to be in the communicated state.

The filter 24 is positioned further upstream in the supply flow path than the supply valve 22. The filter 25 is positioned further upstream in the supply flow path than the supply valve 23. The filters 24 and 25 are respectively configured by a non-woven fabric, a woven fabric, a resin film, or a porous metal piece, for example, and filter the white ink.

A circulation pump 26 and a circulation valve 28 are provided in the tube 84. A circulation pump 27 and a circulation valve 29 are provided in the tube 85. As a result of being driven by a pump motor 261 shown in FIG. 3, the circulation pump 26 sucks up the white ink from the printer tank 17W of the printer 1A, via a portion of the tube 82 further downstream in the supply flow path than the point P2. As a result of being driven by a pump motor 271 shown in FIG. 3, the circulation pump 27 sucks up the white ink from the printer tank 17W of the printer 1*i*, via a portion of the tube 83 further downstream in the supply flow path than the point P3. As a result of being respectively driven by the pump motors 261 and 271 shown in FIG. 3, the circulation pumps 26 and 27 send the sucked up white ink toward server tank 6W, via the tube 86.

The circulation valve 28 is positioned further downstream in the supply flow path than the circulation pump 26. The circulation valve 29 is positioned further downstream in the circulation flow path than the circulation pump 27. The circulation valves 28 and 29 switch between the closed state and the open state as a result of being driven by solenoids 281 and 291 shown in FIG. 3, respectively. In the closed state, the circulation valve 28 causes the tube 84 to be in the blocked state, and in the open state, causes the tube 84 to be in the communicated state. In the closed state, the circulation valve 29 causes the tube 85 to be in the blocked state, and in the open state, causes the tube 85 to be in the communicated state.

In the above-described configuration, by causing one or both of the supply valves 22 and 23 to be in the open state and driving, of the supply pump 20 and the supply pump 21, the supply pump corresponding to the valve[s] in the open state, the liquid supply system 100 supplies the white ink from the server tank 6W to the printer tank 17W via the tube 8.

Hereinafter, an operation in which the liquid supply system 100 supplies the liquid from the server tank 6W toward the printer tank 17W via the tube 8 will be referred to as a "supply operation." In the supply operation of the present embodiment, the liquid supply system 100 can supply the white ink from the server tank 6W to each of the plurality of printer tanks 17W of the plurality of printers 1, via the tube 8, in parallel or to one of the plurality of printers 1 at a time. In other words, in each of the supply flow paths to the plurality of printers 1, the server tank 6W is positioned further upstream than each of the plurality of printers 1.

As an example of a flow of the white ink when the supply operation has been performed, a flow of the white ink from the server tank 6W via the tube 8 toward the printer tanks 17W of each of the printers 1A and 1B in the first white flow path W1 will be described. When the white ink is supplied from the server tank 6W to the printer tank 17W of the printer 1A, the white ink flows from the server tank 6W toward the printer tank 17W of the printer 1A via the tube 81 and the tube 82 (refer to arrows A1). When the white ink is supplied from the server tank 6W to the printer tank 17W of the printer 1, the white ink flows from the server tank 6W toward the printer tank 17W of the printer 1B via the tube 81 and the tube 83 (refer to arrows A2).

In a state in which one or both of the circulation valve 28 and the circulation valve 29 are in the open state, of the circulation pump 26 and the circulation pump 27, the liquid supply system 100 drives the circulation pump corresponding to the valve[s] in the open state, and thus returns the white ink from the printer tank 17W toward the server tank 6W, via the tube 8.

Hereinafter, an operation in which the liquid supply system 100 returns the white ink from the printer tanks 17W toward the server tank 6W via the tube 8 will be referred to as a "return operation." In the return operation of the present embodiment, the liquid supply system 100 can return the white ink from the plurality of printer tanks 17W of each of the plurality of printers 1 to the server tank 6W, via the tube 8, in parallel or from one of the plurality of printers 1 at a time.

As an example of a flow of the white ink when the return operation has been performed, a flow of the white ink from the printer tank 17W of each of the printers 1A and 1B via the tube 8 toward the server tank 6W in the first white flow path W1 will be described. When the white ink is returned to the server tank 6W from the printer tank 17W of the printer 1A, the white ink flows from the printer tank 17W of the printer 1A toward the server tank 6W via the tube 82, the point P2, the tube 84, and the tube 86 (refer to arrows B1). When the white ink is returned to the server tank 6W from the printer tank 17W of the printer 1, the white ink flows from the printer tank 17W of the printer 1B toward the server tank 6W via the tube 83, the point P3, the tube 85, and the tube 86 (refer to arrows B2).

Both when the white ink is supplied from the server tank 6W to the printer tank 17W of the printer 1A, and when the white ink is returned to the server tank 6W from the printer tank 17W of the printer 1A, the white ink flows through a portion of the tube 82 further downstream in the supply flow path than the point P2. Both when the white ink is supplied from the server tank 6W to the printer tank 17W of the printer 1*i*, and when the white ink is returned to the server tank 6W from the printer tank 17W of the printer 1B, the white ink flows through a portion of the tube 83 further downstream in the supply flow path than the point P3.

By performing one of the supply operation or the return operation after the other operation has been performed, the liquid supply system 100 can circulate the white ink between the server tank 6W and the respective printer tanks 17W of the plurality of printers 1, via the tubes 8. By alternating the supply operations and return operations, the liquid supply system 100 may circulate the white ink between the server tank 6W and the respective printer tanks 17W of the plurality of printers 1, via the tubes 8.

Hereinafter, an operation in which the liquid supply system 100 circulates the white ink between the server tank 6W and the printer tank 17W via the tube 8 will be referred to as a "circulation operation." The liquid supply system 100 performs the circulation operation in the first white flow path W1, for example. In this way, the liquid supply system 100 suppresses the white ink from settling inside the server tank 6W and in the first white flow path W1, and in the respective printer tanks of the printers 1A and 1B.

<Electrical Configuration of Printer 1>

As shown in FIG. 2, the printer 1 is provided with a control device 40. The control device 40 is provided with a CPU 41, a ROM 42, a RAM 43, a flash memory 44, and a communication portion 45. The CPU 41 controls the printer 1, and functions as a processor. The CPU 41 controls the print processing, for example. The CPU 41 is electrically connected to the ROM 42, the RAM 43, the flash memory 44, and the communication portion 45.

The ROM 42 stores a control program for the CPU 41 to control operations of the printer 1, information necessary for the CPU 41 when executing various programs, and the like. The RAM 43 temporarily stores various data and the like used by the control program. The flash memory 44 is non-volatile, and stores calibration data of printer sensors 185 to be described later, and the like. The communication portion 45 is a controller for communicating, in a wired or wireless manner with an external device. The CPU 41 communicates with the liquid supply device 2, for example, using the communication portion 45.

The main scanning motor 181, the sub-scanning motor 182, the head driver 183, the supply mechanism 184, the plurality of printer sensors 185, and an operation portion 186 are electrically connected to the CPU 41. The main scanning motor 181, the sub-scanning motor 182, the head driver 183, and the supply mechanism 184 are driven by control of the CPU 41.

The printer sensor 185 is provided in the printer tank 17W shown in FIG. 1. The printer sensor 185 is a pressure sensor, for example. The printer sensor 185 detects a printer remaining amount by detecting a pressure inside the printer tank 17W. The printer remaining amount is a remaining amount of the white ink inside the printer tank 17W. A signal indicating the printer remaining amount detected by the printer sensor 185 is output to the CPU 41.

The operation portion 186 is a touch panel display or the like, displays various information, and outputs information to the CPU 41 in accordance with an operation by the user. By operating the operation portion 186, the user can input, to the printer 1, a print command for starting printing by the printer 1 and the like.

<Electrical Configuration of Liquid Supply Device 2>

As shown in FIG. 3, the liquid supply device 2 is provided with a control device 50. The control device 50 is provided with a CPU 51, a ROM 52, a RAM 53, a flash memory 54, and a communication portion 55. The CPU 51 controls the liquid supply device 2, and functions as a processor. The CPU 51 is electrically connected to the ROM 52, the RAM 53, the flash memory 54, and the communication portion 55.

The ROM 52 stores a control program for the CPU 51 to control operations of the liquid supply device 2, information necessary for the CPU 51 when executing various programs, and the like. The RAM 53 temporarily stores various data and the like used by the control program. The flash memory 54 is non-volatile, and stores calibration data of the server sensors 71, and the like. The communication portion 55 is a controller for communicating, in a wired or wireless manner with an external device. The CPU 51 communicates with each of the printers 1A, 1B, 1C, and 1D, for example, via the communication portion 55.

The agitation motor 963, the pump motors 201, 211, 261, and 271, the solenoids 221, 231, 281, and 291, the server sensor 71, the display 56, and the operation portion 57 are electrically connected to the CPU 51.

The agitation motor 963, the pump motors 201, 211, 261, and 271, the solenoids 221, 231, 281, and 291, and the display 56 are driven by control of the CPU 51. The server sensor 71 is a weight sensor, for example, and detects a server remaining amount by the weight. The server remaining amount is a remaining amount of the white ink inside the server tank 6W. A signal indicating the server remaining amount detected by the server sensor 71 is output to the CPU 51.

<Error Between Remaining Amounts>

In the present embodiment, oscillation may occur in the white ink inside the server tank 6W due to the circulation operation, or a minute amount of the white ink may flow from one to the other of the server tank 6W and the tube 8 after the end of the circulation operation. In this case, there is a possibility that an error may occur between the server remaining amount detected by the server sensor 71 and the actual server remaining amount.

Similarly, oscillation may occur in the white ink inside the printer tank 17W due to the circulation operation, or a minute amount of the white ink may flow from one to the other of the printer tank 17W and the tube 8 after the circulation operation. In this case, there is a possibility that an error may occur between the printer remaining amount detected by the printer sensor 185 and the actual printer remaining amount.

When the above-described error occurs, there is a possibility that the actual server remaining amount after the circulation operation may change from the server remaining amount before the circulation operation, and that the actual printer remaining amount after the circulation operation may change from the printer remaining amount before the circulation operation. For example, in the present embodiment, the actual server remaining amount after the circulation operation may decrease from the server remaining amount before the circulation operation, and the actual printer remaining amount after the circulation operation may increase from the printer remaining amount before the circulation operation. In this case, as a result of repeatedly performing the circulation operation, there is a possibility that the white ink may overflow from the printer tank 17W. In the present embodiment, by performing main processing to be described below, the liquid supply system 100 contributes to suppressing the white ink from overflowing from the printer tank 17W.

<Main Processing>

Figure 4:
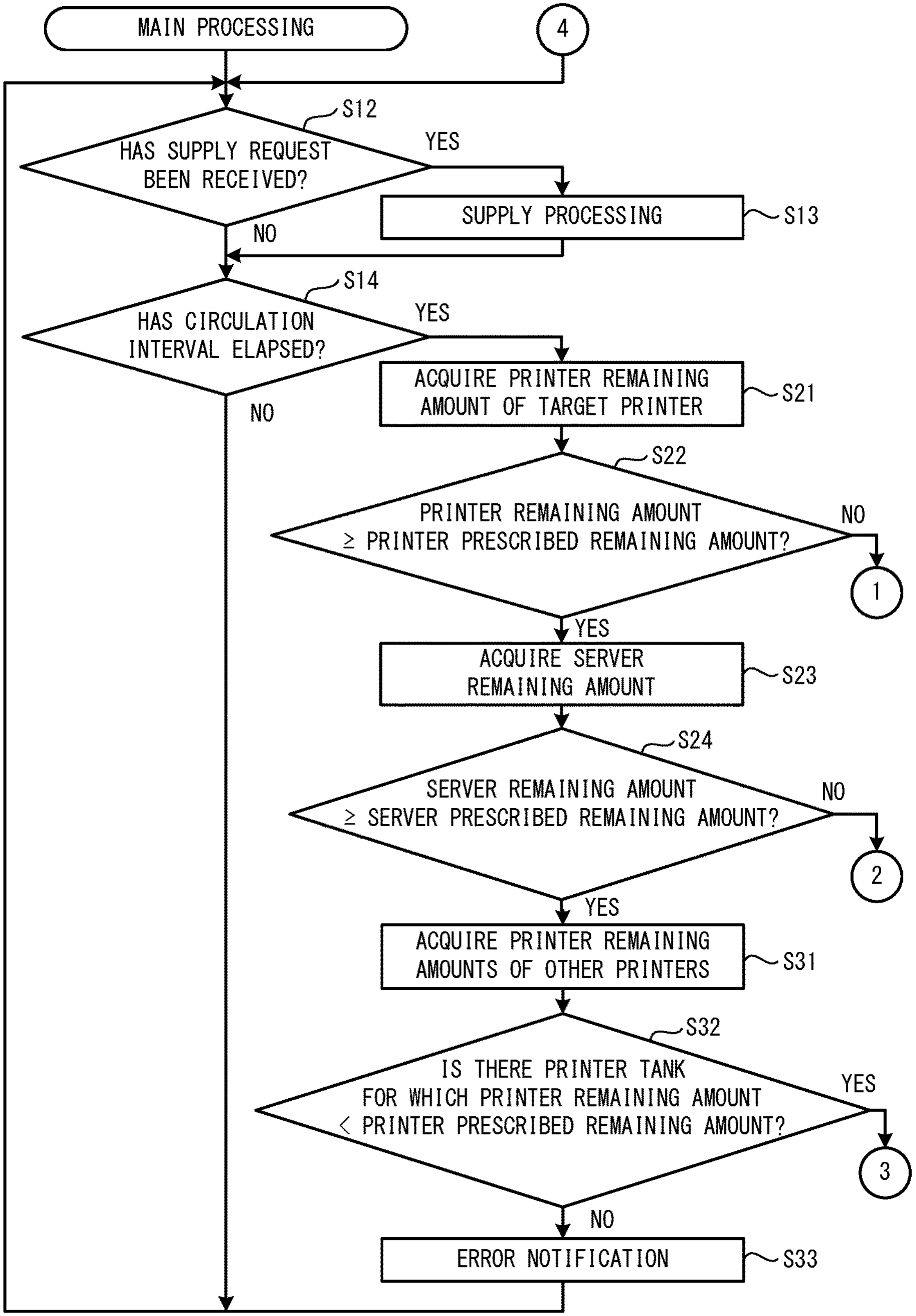
FIG. 4 is a flowchart of main processing.

When a power supply to the liquid supply device 2 is turned on, for example, the CPU 51 performs the main processing shown in FIG. 4, by reading out and executing the control program from the ROM 52. In the main processing, the CPU 51 performs control relating to the supply operation and the return operation. In the main processing, the control relating to the supply operation and the return operation is performed for the second white flow path W2 in a similar manner as for the first white flow path W1. In the present embodiment, with respect to the main processing, the control relating to the first white flow path W1 will be described and a description of the control relating to the second white flow path W2 will be omitted. Hereinafter, the description will be made assuming that, at the start of the main processing, all of the supply valves 22 and 23 and the circulation valves 28 and 29 shown in FIG. 1 are in the closed state.

As shown in FIG. 4, when the main processing is started, the CPU 51 determines whether or not a supply request for performing supply processing (S13) to be described later has been acquired from the printer 1A or the printer 1B (S12). For example, when the printer 1A performs the print processing using the white ink, the white ink in the printer tank 17W of the printer 1A is consumed and the printer remaining amount of the printer 1A decreases. For example, in the printer 1A, when the printer remaining amount has become equal to or less than a predetermined supply start remaining amount, the CPU 41 transmits the supply request to the liquid supply device 2. The supply start remaining amount is stored in advance in the flash memory 44, for example.

When the supply request has not been acquired from either the printer 1A or the printer 1B (no at S12), the CPU 51 shifts the processing to S14. When the supply request has been received from the printer 1A or the printer 1B (yes at S12), the CPU 51 performs the supply processing (S13).

In the supply processing (S13), the CPU 51 controls the supply operation for the printer tank 17W of the printer 1 from which the supply request has been acquired. For example, when the supply request has been acquired from the printer 1A, the CPU 51 controls the solenoid 221 shown in FIG. 3 in the supply operation, and causes the supply valve 22 shown in FIG. 1 to be in the open state. In this state, the CPU 51 controls the pump motor 201 shown in FIG. 3, and starts the driving of the supply pump 20 shown in FIG. 1. In this way, the white ink is supplied from the server tank 6W to the printer tank 17W of the printer 1A, via the tube 8.

When, for example, the printer remaining amount has reached a predetermined supply stop remaining amount as a result of the supply operation, the CPU 41 transmits a supply stop request to the liquid supply device 2. The supply stop remaining amount is stored in advance in the flash memory 44, for example. The supply stop remaining amount is greater than the supply start remaining amount, for example. When the supply stop request has been acquired from the printer 1A, for example, the CPU 51 stops the driving of the pump motor 201 shown in FIG. 3, and stops the driving of the supply pump 20 shown in FIG. 1. The CPU 51 controls the solenoid 221 shown in FIG. 3 and causes the supply valve 22 shown in FIG. 1 to be in the closed state. In this way, the CPU 51 stops the supply operation and ends the supply processing.

The CPU 51 refers to the timer counter in the RAM 53, and determines whether or not a circulation interval has elapsed (S14) for each of the printers 1A and 1B. In the present embodiment, circulation processing (S60, refer to FIG. 5) to be described later is periodically performed for the printer tank 17W of each of the printers 1A and 1B. First circulation processing and second circulation processing will be defined. The first circulation processing is one of the circulation processing that is periodically performed. The second circulation processing is the circulation processing subsequent to the first circulation processing, of the circulation processing that is periodically performed. The circulation interval is a time period between the first circulation processing and the second circulation processing, and is stored in advance in the flash memory 54, for example. The circulation interval is not limited to a specific length, and is 4 hours, for example.

When the circulation interval has not elapsed (no at S14) for either of the printers 1A and 1B, the CPU 51 returns the processing to S12. Hereinafter, the printer 1 in which the circulation interval has elapsed will be referred to as a "target printer." When the circulation interval has elapsed (yes at S14) in the printer 1A or the printer 1B, the CPU 51 acquires the printer remaining amount from the printer sensor 185 of the target printer (S21).

In the processing at S21, for example, the CPU 51 transmits, to the target printer, a remaining amount request for requesting the printer remaining amount from the target printer. In the target printer, when the CPU 41 receives the remaining amount request, the CPU 41 transmits the printer remaining amount indicated by the signal from the printer sensor 185 to the liquid supply device 2. The CPU 51 acquires the printer remaining amount transmitted from the target printer.

The CPU 51 determines whether or not the printer remaining amount of the target printer acquired by the processing at S21 is equal to or greater than a printer prescribed remaining amount (S22). The printer prescribed remaining amount is less than the difference between a printer maximum increase amount and a capacity of the printer tank 17W, and in the present embodiment, is greater than the supply start remaining amount and greater than the supply stop remaining amount. The printer maximum increase amount is the difference between the printer remaining amount at a start of the circulation processing to be described later, and a maximum printer remaining amount in a period from the start to the end of the circulation processing. The capacity of the printer tank 17W is a maximum value of the amount of white ink stored inside the printer tank 17W, when the white ink does not overflow from the printer tank 17W during normal usage of the printer tank 17W. Normal usage of the printer tank 17W means that the printer tank 17W is used when placed on a horizontal surface, that the printer tank 17W is used when mounted to a mounting portion (not shown in the drawings) for mounting the printer tank 17W, or the like. For example, when an inlet opening is provided for pouring the ink into the printer tank 17W, the capacity of the printer tank 17W may be determined as a volume of the lower portion of the printer tank 17W lower than a position of the lower edge of the inlet opening in the up-down direction. The printer prescribed remaining amount is stored in advance in the flash memory 54, for example.

In the target printer, for example, when an execution frequency of the print processing using the white ink from the time the circulation processing was previously performed is high, the printer remaining amount is decreased from the time the circulation processing was previously performed, and thus, the printer remaining amount is more likely to be less than the printer prescribed remaining amount. When the printer remaining amount is less than the printer prescribed remaining amount (no at S22), the CPU 51 performs the circulation processing shown in FIG. 5 (S60). After the circulation processing, the CPU 51 returns the processing to S12.

The circulation processing (S60) will be described in detail with reference to FIG. 6. In the circulation processing, the CPU 51 controls the circulation operation for the printer tank 17W of the target printer. When the circulation processing is started, the CPU 51 acquires the server remaining amount from the server sensor 71 shown in FIG. 3 (S61). The CPU 51 stores the server remaining amount acquired by the processing at S61 in the RAM 53, as a pre-circulation remaining amount (S62). The pre-circulation remaining amount is the server remaining amount at the start of the circulation operation, and in the present embodiment, is the server remaining amount at the start of the supply operation in processing at S63 to be described below.

The CPU 51 starts the supply operation for the printer tank 17W of the target printer (S63). For example, when the target printer is the printer 1A, in the processing at S63, the CPU 51 controls the solenoid 221 shown in FIG. 3 and causes the supply valve 22 shown in FIG. 1 to be in the open state. In this state, the CPU 51 controls the pump motor 201 shown in FIG. 3 and starts the driving of the supply pump 20 shown in FIG. 1. In this way, the white ink is supplied from the server tank 6W to the printer tank 17W of the printer 1A (the target printer), via the tube 8.

The CPU 51 refers to the timer counter in the RAM 53, and determines whether or not a supply time period has elapsed (S64). The supply time period is a time period from the start to the end of the supply operation, and is stored in advance in the flash memory 54, for example.

When the supply time period has not elapsed (no at S64), the CPU 51 repeats the processing at S64 until the supply time period has elapsed. When the supply time period has elapsed (yes at S64), the CPU 51 stops the supply operation for the printer tank 17W of the target printer (S65). In the processing at S65, the CPU 51 stops the driving of the pump motor 201 shown in FIG. 3, and stops the driving of the supply pump 20 shown in FIG. 1. The CPU 51 controls the solenoid 221 shown in FIG. 3 and causes the supply valve 22 shown in FIG. 1 to be in the closed state. In this way, the supply of the white ink from the server tank 6W to the printer tank 17W of the printer 1A (the target printer) via the tube 8 is stopped.

The CPU 51 starts the return operation for the printer tank 17W of the target printer (S71). For example, when the target printer is the printer 1A, in the processing at S71, the CPU 51 controls the solenoid 281 shown in FIG. 3, and causes the circulation valve 28 shown in FIG. 1 to be in the open state. In this state, the CPU 51 controls the pump motor 261 shown in FIG. 3 and starts the driving of the circulation pump 26 shown in FIG. 1. In this way, the white ink is returned from the printer tank 17W of the printer 1A (the target printer) to the server tank 6W via the tube 8.

The CPU 51 acquires the server remaining amount from the server sensor 71 shown in FIG. 3 (S72). The CPU 51 determines whether or not the server remaining amount acquired by the processing at S72 has reached the pre-circulation remaining amount stored by the processing at S62 (S73). When the server remaining amount has not reached the pre-circulation remaining amount (no at S73), the CPU 51 returns the processing to S72.

When the server remaining amount has reached the pre-circulation remaining amount (yes at S73), the CPU 51 stops the return operation for the printer tank 17W of the target printer (S74). In the processing at S74, for example, the CPU 51 stops the driving of the pump motor 261 shown in FIG. 3, and stops the driving of the circulation pump 26 shown in FIG. 1. The CPU 51 controls the solenoid 281 shown in FIG. 3 and causes the circulation valve 28 shown in FIG. 1 to be in the closed state. In this way, the returning of the white ink from the printer tank 17W of the printer 1A (the target printer) to the server tank 6W via the tube 8 is stopped. The CPU 51 returns the processing to the main processing shown in FIG. 5.

In the processing at S22 shown in FIG. 4, when the printer remaining amount is equal to or greater than the printer prescribed remaining amount (yes at S22), the CPU 51 acquires the server remaining amount from the server sensor 71 shown in FIG. 3 (S23). The CPU 51 determines whether or not the server remaining amount acquired by the processing at S23 is equal to or greater than a server prescribed remaining amount (S24). The server prescribed remaining amount is less than the difference between a server maximum increase amount and a capacity of the server tank 6W. The server maximum increase amount is the difference between the server remaining amount at the start of the circulation processing (the pre-circulation remaining amount), and a maximum server remaining amount in a period from the start to the end of the circulation processing. When the maximum server remaining amount from the start to the end of the circulation processing is not greater than the server remaining amount at the start of the circulation processing, that is, when the server remaining amount does not increase, during the circulation processing, from the server remaining amount at the start of the circulation processing, the server maximum increase amount is "zero." More specifically, as will be described later with reference to FIG. 7, in the present embodiment, the server maximum increase amount is "zero." Thus, it is sufficient that the server prescribed remaining amount be less than the capacity of the server tank 6W. The server prescribed remaining amount is stored in advance in the flash memory 54, for example. The capacity of the server tank 6W is a maximum value of the amount of white ink stored inside the server tank 6W, when the white ink does not overflow from the server tank 6W during normal usage of the server tank 6W. Normal usage of the server tank 6W means that the server tank 6W is used when placed on a horizontal surface, that the server tank 6W is used when mounted to a mounting portion (not shown in the drawings) for mounting the server tank 6W, or the like. For example, when an inlet opening is provided for pouring the ink into the server tank 6W, the capacity of the server tank 6W may be determined as a volume of the lower portion of the server tank 6W lower than a position of the lower edge of the inlet opening in the up-down direction.

Figure 5:
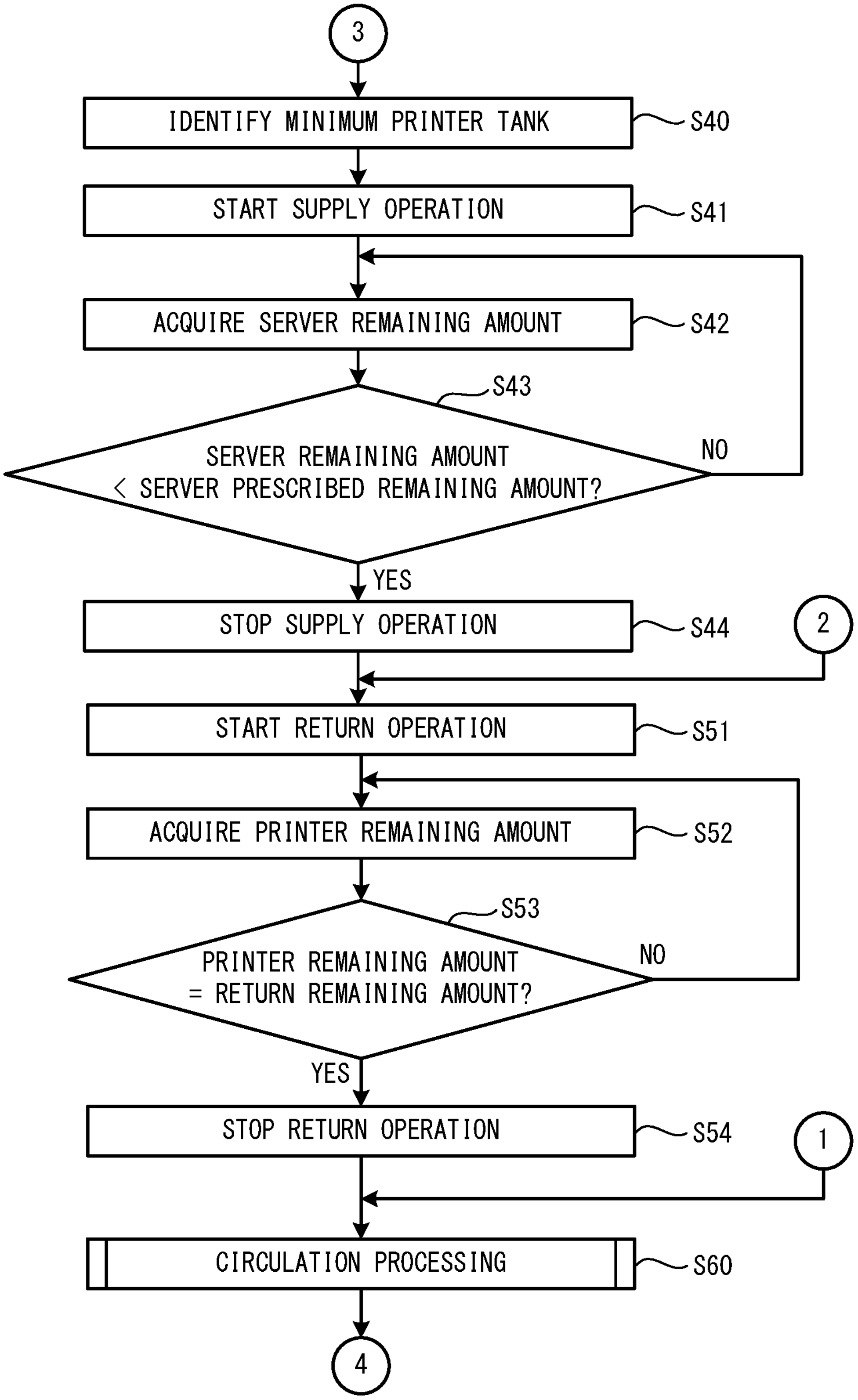
FIG. 5 is a flowchart of the main processing.

When the server remaining amount is less than the server prescribed remaining amount (no at S24), the CPU 51 shifts the processing to step S51 shown in FIG. 5. When the server remaining amount is equal to or greater than the server prescribed remaining amount (yes at S24), the CPU 51 acquires the printer remaining amounts from the printer sensor 185 of others of the printers 1 (S31). The other printers 1 are, of the plurality of printers 1, the printers 1 other than the target printer, and are two or more of the printers 1. For example, when the target printer is the printer 1A, the other printers are the printers 1B, 1C, and 1D.

The CPU 51 determines, based on each of the printer remaining amounts acquired by the processing at S31, whether or not there is the printer tank 17W in which the printer remaining amount is less than the printer prescribed remaining amount, among each of the printer tanks 17W of the other printers 1 (S32). When there is no printer tank 17W in which the printer remaining amount is less than the printer prescribed remaining amount (no at S32), the liquid supply system 100 is in an error state, and the CPU 51 performs error notification (S33). In this case, the CPU 51 returns the processing to S12 without performing the circulation processing (S60) shown in FIG. 5 and first liquid delivery processing to be described later (S51 to S54).

For example, if a user fills the server tank 6W with white ink such that the server remaining amount is equal to or greater than the server prescribed remaining amount, in a state in which the printer remaining amounts of each of the plurality of printers 1 is equal to or greater than the printer prescribed remaining amount, the liquid supply system 100 is in an error state. The error notification is not limited to a specific format, and the CPU 51 performs error display on the display 56 shown in FIG. 3, for example, and causes a warning lamp (not shown in the drawings) to be illuminated. For example, when the printing processing that uses the white ink is performed in any one of the plurality of printers 1, the printer remaining amount falls. The error may be cancelled when the printer remaining amount in any one of the plurality of printers 1 becomes less than the printer prescribed remaining amount. The error may be cancelled when the printer remaining amount of the target printer has become less than the printer prescribed remaining amount.

In the processing at S32, when there is the printer tank 17W in which the printer remaining amount is less than the printer prescribed remaining amount (yes at S32), the CPU 51 shifts the processing to S40 shown in FIG. 5.

As shown in FIG. 5, based on the printer remaining amounts of the other printers 1 acquired by the processing at S31, the CPU 51 identifies a minimum printer tank from among the printer tanks 17W in which the printer remaining amount is less than the printer prescribed remaining amount (S40). The minimum printer tank is the printer tank 17W, of the printer tanks 17W in which the printer remaining amount is less than the printer prescribed remaining amount, in which the printer remaining amount is the least.

The CPU 51 starts the supply operation for the minimum printer tank identified by the processing at S40 (S41). For example, when the minimum printer tank is the printer tank 17W of the printer 1B, in the processing at S41, the CPU 51 controls a solenoid 231 shown in FIG. 3 and causes the supply valve 23 shown in FIG. 1 to be in the open state. In this state, the CPU 51 controls the pump motor 211 shown in FIG. 3, and starts the driving of the supply pump 21 shown in FIG. 1. In this way, the white ink is supplied from the server tank 6W to the printer tank 17W of the printer 1B (the minimum printer tank), via the tube 8. In this case, the white ink is not supplied to the printer tank 17W of the target printer (the printer 1A, for example).

The CPU 51 acquires the server remaining amount from the server sensor 71 shown in FIG. 3 (S42). The CPU 51 determines whether or not the server remaining amount acquired by the processing at S42 has become less than the server prescribed remaining amount (S43). When the server remaining amount is equal to or greater than the server prescribed remaining amount (no at S43), the CPU 51 returns the processing to S42.

When the server remaining amount has become less than the server prescribed remaining amount (yes at S43), the CPU 51 stops the supply operation for the minimum printer tank (S44). In the processing at S44, for example, the CPU 51 stops the driving of the pump motor 211 shown in FIG. 3, and stops the driving of the supply pump 21 shown in FIG. 1. The CPU 51 controls the solenoid 231 shown in FIG. 3 and causes the supply valve 23 shown in FIG. 1 to be in the closed state. In this way, the supply of the white ink from the server tank 6W to the printer tank 17W of the printer 1B (the minimum printer tank) via the tube 8 is stopped.

Figure 6:
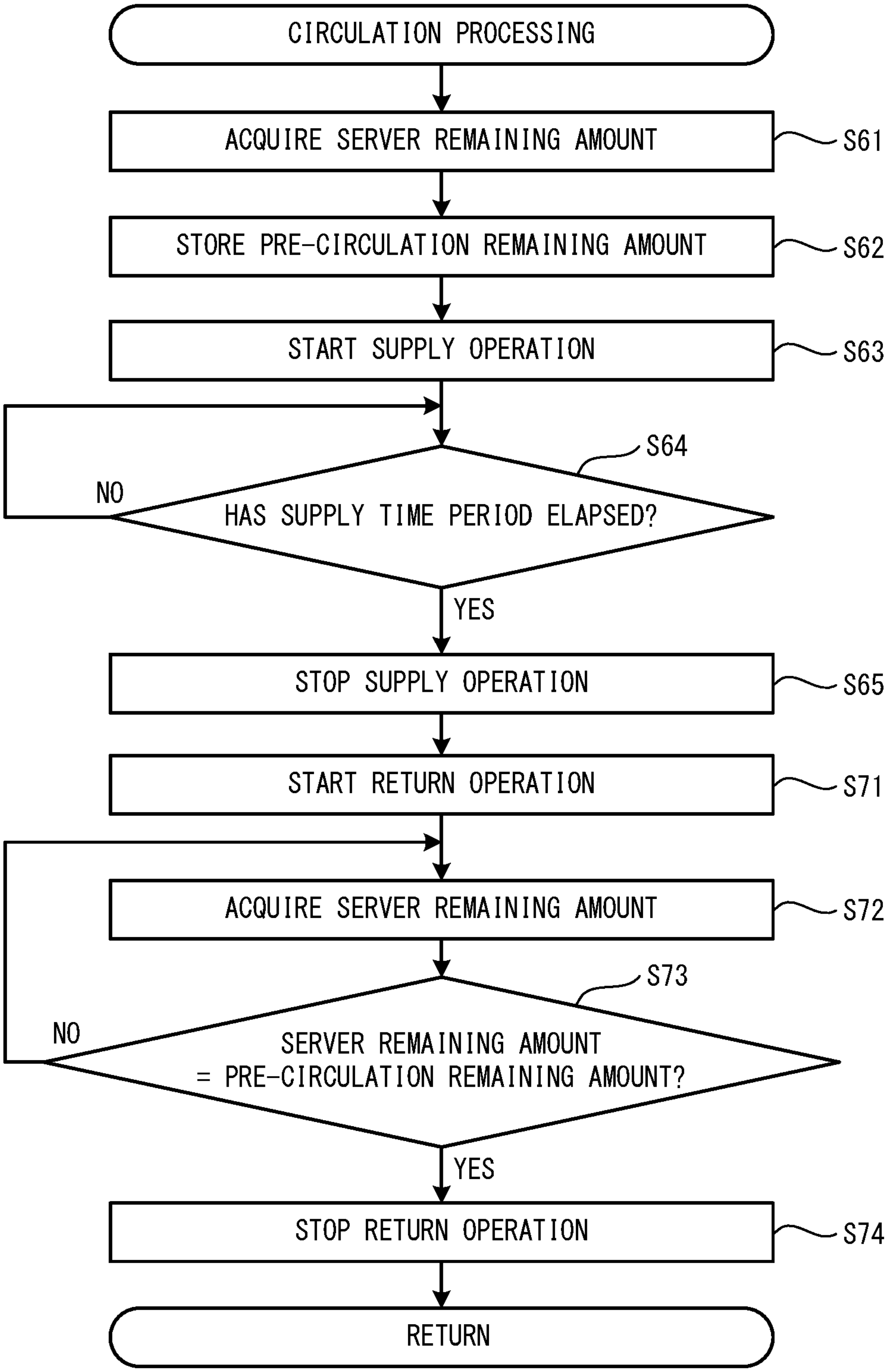
FIG. 6 is a flowchart of circulation processing.

After the processing at S44, or in the processing at S24 shown in FIG. 4, when the server remaining amount becomes less than the server prescribed remaining amount (no at S24), in a similar manner to the processing at S71 shown in FIG. 6, the CPU 51 starts the return operation for the printer tank 17W of the target printer (S51). In this way the white ink is returned to the server tank 6W from the printer tank 17W of the printer 1A (the target printer), via the tube 8.

The CPU 51 acquires the printer remaining amount from the printer sensor 185 of the target printer (S52). The CPU 51 determines whether or not the printer remaining amount acquired by the processing at S52 has reached a return remaining amount (S53). The return remaining amount is the printer remaining amount at the end of the return operation, and is less than the difference between the printer prescribed remaining amount and the printer maximum increase amount. The return remaining amount is stored in advance in the flash memory 54, for example.

When the printer remaining amount is greater than the return remaining amount (no at S53), the CPU 51 returns the processing to S52. When the printer remaining amount has reached the return remaining amount (yes at S53), the CPU 51 stops the return operation for the printer tank 17W of the target printer (S54). In this way, the returning of the white ink from the printer tank 17W of the printer 1A (the target printer) to the server tank 6W via the tube 8 is stopped. The CPU 51 performs the circulation processing (S60), and returns the processing to S12 shown in FIG. 4.

Hereinafter, the processing from S51 to S54 will be referred to as "first liquid delivery processing," and the amount of white ink delivered by the first liquid delivery processing from the printer tank 17W of the target printer to the server tank 6W via the tube 8 will be referred to as a "return amount."

The return amount will be described. The return amount is the difference between the printer remaining amount of the target printer at the start of the first liquid delivery processing and the printer remaining amount (the return remaining amount) of the target printer at the end of the first liquid delivery processing. The first liquid delivery processing is performed when the printer remaining amount of the target printer is equal to or greater than the printer prescribed remaining amount. Thus, the printer remaining amount of the target printer at the start of the first liquid delivery processing is equal to or greater than the printer prescribed remaining amount. Furthermore, the first liquid delivery processing is stopped when the printer remaining amount of the target printer has reached the return remaining amount. Thus, the printer remaining amount of the target printer at the end of the first liquid delivery processing is the return remaining amount. In this way, the printer remaining amount of the target printer at the end of the first liquid delivery processing is a constant value that is the return remaining amount, and a minimum value of the printer remaining amount of the target printer at the start of the first liquid delivery processing is the printer prescribed remaining amount, and thus, a minimum value of the return amount is the difference between the printer prescribed remaining amount and the return remaining amount. The return remaining amount is less than the difference between the printer prescribed remaining amount and the printer maximum increase amount. Thus, the return amount is greater than the printer maximum increase amount. In this case, the circulation processing is performed after the first liquid delivery processing, and even if the printer remaining amount increases from the return remaining amount by an amount corresponding to the printer maximum increase amount, the printer remaining amount is suppressed from becoming equal to or greater than the printer prescribed remaining amount. As a result, the white ink is suppressed from overflowing from the printer tank 17W of the target printer during the circulation processing.

<Transitions in Remaining Amounts of White Ink>

An example of transitions in the server remaining amount and the printer remaining amount of the target printer will be described with reference to FIG. 7 and FIG. 8. Hereinafter, a case is assumed in which, when the circulation interval has elapsed (yes at S14), the printer remaining amount of the target printer is equal to or greater than the printer prescribed remaining amount (yes at S22), the server remaining amount is equal to or greater than the server prescribed remaining amount (yes at S24), and there is the printer tank 17W of the other printer 1 in which the printer remaining amount is less than the printer prescribed remaining amount (yes at S32).

Figure 7:
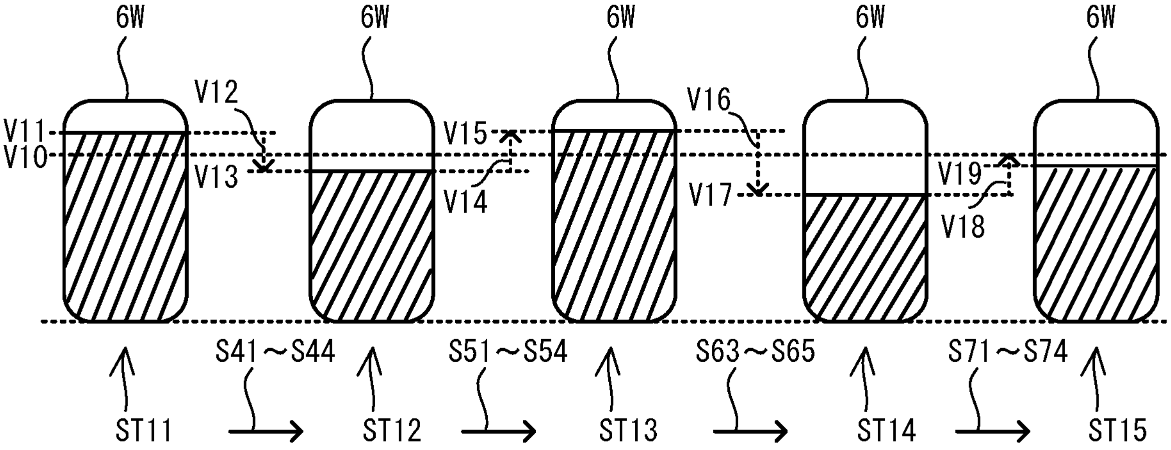
FIG. 7 shows an example transition of a server remaining amount.

As shown in FIG. 7, a state ST11 shows the server tank 6W when the circulation interval has elapsed. Thus, a remaining amount V11 is the server remaining amount when the circulation interval has elapsed. A remaining amount V10 is the server prescribed remaining amount. The remaining amount V11 is greater than the remaining amount V10 (the server prescribed remaining amount).

Figure 8:
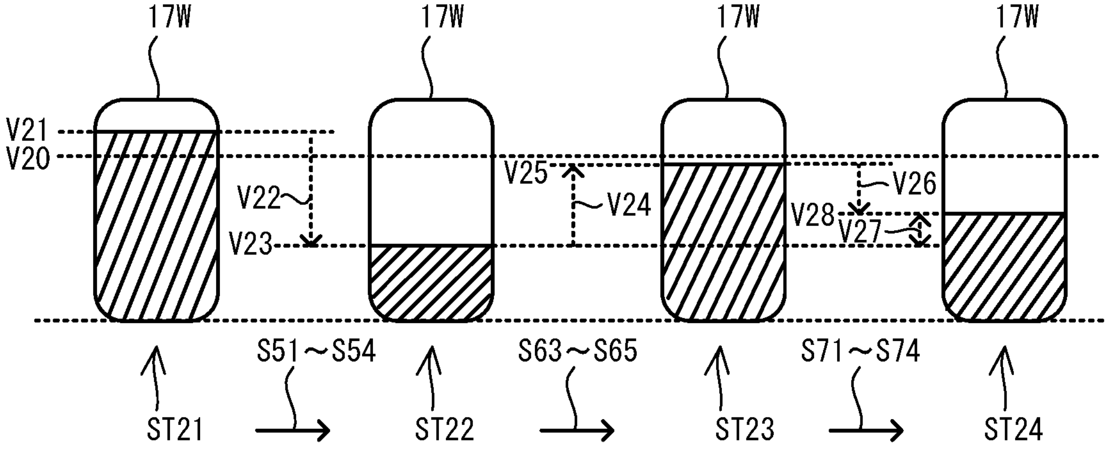
FIG. 8 shows an example transition of a printer remaining amount of a target printer.

As shown in FIG. 8, a state ST21 shows the printer tank 17W of the target printer when the circulation interval has elapsed. Thus, a remaining amount V21 is the printer remaining amount of the target printer when the circulation interval has elapsed. A remaining amount V20 is the printer prescribed remaining amount. The remaining amount V21 is greater than the remaining amount V20 (the printer prescribed remaining amount).

As shown in FIG. 7, when the supply operation is performed for the minimum printer tank by the processing from S41 to S44 shown in FIG. 5 (hereinafter referred to as "second liquid delivery processing"), the server remaining amount decreases, by an amount corresponding to an amount V12, from the remaining amount V11 shown by the state ST11 to a remaining amount V13 shown by a state ST12. The remaining amount V13 is less than the server prescribed remaining amount (the remaining amount V10). Note that even if the supply operation has been performed for the minimum printer tank by the second liquid delivery processing, the printer remaining amount of the target printer does not change, and thus, the printer tank 17W of the target printer does not change from the state ST21 shown in FIG. 8.

When the return operation is performed for the printer tank 17W of the target printer by the first liquid delivery processing (S51 to S54) shown in FIG. 5, the server remaining amount increases, by an amount corresponding to an amount V14, from the remaining amount V13 shown by the state ST12 to a remaining amount V15 shown by a state ST13. The amount V14 is the return amount. In FIG. 7, the remaining amount V15 is greater than the remaining amount V10 (the server prescribed remaining amount). In contrast to this, the remaining amount V15 may be equal to or less than the remaining amount V10, depending on a relationship with the remaining amount V13 and the amount V14.

As shown in FIG. 8, when the return operation is performed for the printer tank 17W of the target printer by the first liquid delivery processing (S51 to S54) shown in FIG. 5, the printer remaining amount of the target printer decreases, by an amount corresponding to an amount V22, from the remaining amount V21 shown by the state ST21 to a remaining amount V23 shown by a state ST22. The amount V22 is the return amount. The remaining amount V23 is the return remaining amount.

As shown in FIG. 7, when the supply operation is performed for the printer tank 17W of the target printer by the processing at S63 to S65 shown in FIG. 6, the server remaining amount decreases, by an amount corresponding to an amount V16, from the remaining amount V15 shown by the state ST13 to a remaining amount V17 shown by a state ST14. In the present embodiment, the amount V16 is an amount of the white ink corresponding to the supply time period.

As shown in FIG. 8, when the supply operation is performed for the printer tank 17W of the target printer by the processing at S63 to S65 shown in FIG. 6, the printer remaining amount of the target printer increases, by an amount corresponding to an amount V24, from the remaining amount V23 shown by the state ST22 to a remaining amount V25 shown by a state ST23. In the present embodiment, during a period from the start to the end of the circulation processing, the printer remaining amount does not exceed the remaining amount V25 of the circulation processing. Thus, the amount V24 is the printer maximum increase amount, and in the present embodiment, is the amount of the white ink corresponding to the supply time period.

As shown in FIG. 7, when the return operation is performed for the printer tank 17W of the target printer by the processing at S71 to S74 shown in FIG. 6, the server remaining amount increases, by an amount corresponding to an amount V18, from the remaining amount V17 shown by the state ST14 to a remaining amount V19 shown by a state ST15. In the present embodiment, in the circulation processing, the supply operation is performed before the return operation. Furthermore, as described above, due to a detection error by the server sensor 71 at the end of the circulation processing, or the like, the actual amount V16 of the white ink supplied from the server tank 6W to the printer tank 17W of the target printer via the tube 8 by the supply operation is less than the actual amount V18 of the white ink returned from the printer tank 17W of the target printer to the server tank 6W via the tube 8 by the return operation. Thus, the CPU 51 at S73 determines whether or not the server remaining amount acquired by the processing at S72 has reached the pre-circulation remaining amount stored by the processing at S62, but in actuality, during a period from the start to the end of the circulation processing, the server remaining amount does not exceed the remaining amount V15 at the start of the circulation processing. Thus, the server maximum increase amount is "zero." For example, in the circulation processing, when the return operation is performed before the supply operation, the server maximum increase amount becomes the amount of the white ink supplied from the server tank 6W to the printer tank 17W of the target printer via the tube 8 by the supply operation, and becomes greater than "zero."

As shown in FIG. 8, when the return operation is performed for the printer tank 17W of the target printer by the processing at S71 to S74 shown in FIG. 6, the printer remaining amount of the target printer decreases, by an amount corresponding to an amount V26, from the remaining amount V25 shown by the state ST23, to a remaining amount V28 shown by a state ST24. Note that the return operation is stopped by the processing at S74 when the server remaining amount reaches the pre-circulation remaining amount. However, as described above, due to a detection error by the server sensor 71 at the end of the circulation processing, or the like, in the state ST24, the actual printer remaining amount of the target printer may become the remaining amount V28 that is greater than the remaining amount V23 by an amount corresponding to an amount V27.

Note that, when the circulation interval has elapsed, if the printer remaining amount of the target printer is equal to or greater than the printer prescribed remaining amount and the server remaining amount is less than the server prescribed remaining amount, the printer remaining amount of the target printer transitions from the state ST21 shown in FIG. 8 in a similar manner to the transitions described above. In this case, the server remaining amount transitions from the state ST12 shown in FIG. 7. When the circulation interval has elapsed, if the printer remaining amount of the target printer is less than the printer prescribed remaining amount, the printer remaining amount of the target printer transitions from the state ST22 shown in FIG. 8. In this case, the server remaining amount transitions from the state ST13 shown in FIG. 7.

<Effects of Embodiment>

In the above-described embodiment, the liquid supply system 100 supplies the white ink to the printer tank 17W provided in the printer 1. The tube 8 connects the printer tank 17W and the server tank 6W storing the white ink. The supply pumps 20 and 21, the supply valves 22 and 23, the circulation pumps 26 and 27, and the circulation valves 28 and 29 (hereinafter referred to as a "liquid delivery mechanism") are provided in the tube 8, and perform the supply operation of supplying the white ink from the server tank 6W to the printer tank 17W via the tube 8, and the return operation of returning the white ink from the printer tank 17W to the server tank 6W via the tube 8. In the circulation processing (S60), the CPU 51 causes the liquid delivery mechanism to perform the supply operation and the return operation. When the printer remaining amount has become equal to or greater than the printer prescribed remaining amount, before the circulation processing (S60), in the first liquid delivery processing (S51 to S54), the CPU 51 causes the liquid delivery mechanism to perform the return operation that delivers the white ink from the printer tank 17W to the server tank 6W via the tube 8.

According to this configuration, when the printer remaining amount becomes equal to or greater than the printer prescribed remaining amount, before the circulation processing, the white ink is delivered from the printer tank 17W to the server tank 6W by the first liquid delivery processing. In this way, the printer remaining amount decreases. Thus, even when the circulation processing is subsequently performed, the white ink is suppressed from overflowing from the printer tank 17W. As a result, the CPU 51 contributes to suppressing the white ink from overflowing from the printer tank 17W.

The CPU 51 performs the first liquid delivery processing and the circulation processing in that order for the target printer when the circulation interval has elapsed, and the printer remaining amount of the target printer is equal to or greater than the printer prescribed remaining amount. Thus, the CPU 51 contributes to shortening a down time caused by the first liquid delivery processing, compared to a case in which the first liquid delivery processing is separately performed without regard to the circulation processing.

The printer prescribed remaining amount is less than the difference between the printer maximum increase amount and the capacity of the printer tank 17W. The printer maximum increase amount is the difference between the printer remaining amount at the start of the circulation processing and the maximum remaining amount of the white ink in the printer tank 17W from the start to the end of the circulation processing. For example, in a state in which the printer remaining amount is slightly less than the printer prescribed remaining amount, the first liquid delivery processing is not performed. Even in this case, since the printer prescribed remaining amount is less than the difference between the printer maximum increase amount and the capacity of the printer tank 17W, even if the printer remaining amount increases by an amount corresponding to the printer maximum increase amount as a result of the circulation processing, the increased printer remaining amount is suppressed from reaching the capacity of the printer tank 17W. Thus, the liquid supply system 100 contributes to further suppressing the white ink from overflowing from the printer tank 17W.

The amount of the white ink delivered from the printer tank 17W to the server tank 6W via the tube 8 by the return operation in the first liquid delivery processing (the return amount) is greater than the printer maximum increase amount. According to this configuration, even when the first liquid delivery processing is performed after the circulation processing, the printer remaining amount is suppressed from becoming equal to or greater than the printer prescribed remaining amount as a result of the circulation processing. Thus, the liquid supply system 100 contributes to reducing an execution frequency of the first liquid delivery processing.

When the printer remaining amount is equal to or greater than the printer prescribed remaining amount and the server remaining amount is equal to or greater than the server prescribed remaining amount, the CPU 51 prohibits the execution of the first liquid delivery processing and the circulation processing. According to this configuration, the white ink is suppressed from overflowing from the server tank 6W as a result of the first liquid delivery processing. Thus, the CPU 51 contributes to suppressing the white ink from overflowing from the server tank 6W, in addition to the printer tank 17W.

When the printer remaining amount of the target printer is equal to or greater than the printer prescribed remaining amount, and the server remaining amount is equal to or greater than the server prescribed remaining amount, before the first liquid delivery processing, in the second liquid delivery processing, the CPU 51 causes the liquid delivery mechanism to perform the supply operation that supplies the white ink from the server tank 6W to the printer tanks 17W of the other printers 1 via the tube 8, until the server remaining amount becomes less than the server prescribed remaining amount. According to this configuration, the white ink is returned to the server tank 6W from the printer tank 17W of the target printer via the tube 8 by the first liquid delivery processing in the state in which the server remaining amount has become less than the server prescribed remaining amount. Thus, the CPU 51 contributes to suppressing the white ink from overflowing from the server tank 6W, in addition to the printer tank 17W.

In the second liquid delivery processing, the CPU 51 causes the liquid delivery mechanism to perform the supply operation that supplies the white ink from the server tank 6W to the minimum printer tank, in which the printer remaining amount is the least, via the tube 8. According to this configuration, the CPU 51 contributes to increasing the printer remaining amount of the minimum printer tank, by suppling the white ink to the minimum printer tank. For example, even if the server tank 6W is unable to supply the white ink to each of the printer tanks 17W of the plurality of printers 1, due to a malfunction of the liquid supply device 2 or the like, by supplying the white ink in advance to the minimum printer tank in the second liquid delivery processing, a quantity of the print medium that can be printed by the printer 1 that is the minimum printer tank increases. Thus, the CPU 51 contributes to suppressing a down time of the printer 1 when the liquid supply device 2 malfunctions or the like.

<Modified Examples>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below. Modified examples described below may be combined with each other as appropriate insofar as no contradictions arise. In the above-described embodiment, when the circulation interval has elapsed, the CPU 51 acquires the printer remaining amount of the target printer in the processing at S21. In contrast to this, the CPU 51 may acquire the printer remaining amounts of each of the plurality of printers 1, regardless of whether or not the circulation interval has elapsed. For example, when the printer remaining amount of any one of the plurality of printers 1 has become equal to or greater than the printer prescribed remaining amount, the CPU 51 may perform the processing from S23 onward without waiting for the circulation interval to elapse. In this case, if the printer remaining amounts of all of the plurality of printers 1 are less than the printer prescribed remaining amount, the CPU 51 may return the processing to S12.

As long as the printer prescribed remaining amount is less than the capacity of the printer tank 17W, the printer prescribed remaining amount may be the same as the difference between the printer maximum increase amount and the capacity of the printer tank 17W, or may be greater than the difference between the printer maximum increase amount and the capacity of the printer tank 17W. The return amount may be the same as the printer maximum increase amount, or may be greater than the printer maximum increase amount. The printer prescribed remaining amount may be the same as the supply start remaining amount, or may be less than the supply start remaining amount. The printer prescribed remaining amount may be the same as the supply stop remaining amount, or may be less than the supply stop remaining amount.

In the above-described embodiment, when the server remaining amount increases as a result of the circulation processing, in the processing at S22, the CPU 51 may determine whether or not the server remaining amount has become equal to or greater than the server prescribed remaining amount. In this case, if the server remaining amount is equal to or greater than the server prescribed remaining amount (yes at S22), the CPU 51 may omit the second liquid delivery processing, and, in the first liquid delivery processing, may cause the liquid delivery mechanism to perform the supply operation to deliver the white ink from the server tank 6W to the printer tank 17W of the target printer via the tube 8. In this case, the CPU 51 may perform the circulation processing after the first liquid delivery processing. Hereinafter, a modified example in which, in the first liquid delivery processing, the CPU 51 causes the liquid delivery mechanism to perform the supply operation to deliver the white ink from the server tank 6W to the printer tank 17W via the tube 8 will be referred to as a "modified example of the first liquid delivery processing." In the modified example of the first liquid delivery processing, since the server remaining amount has decreased before the circulation processing, the CPU 51 contributes to suppressing the white ink from overflowing from the server tank 6W.

In the modified example of the first liquid delivery processing, the amount of the white ink delivered by the first liquid delivery processing from the server tank 6W to the printer tank 17W of the target printer via the tube 8 will be referred to as a "supply amount." The supply amount is preferably greater than the server maximum increase amount, but may be the same as the server maximum increase amount or may be less than the server maximum increase amount.

The server prescribed remaining amount is preferably less than the difference between the server maximum increase amount and the capacity of the server tank 6W, but as long as the server prescribed remaining amount is less than the capacity of the server tank 6W, the server prescribed remaining amount may be the same as the difference between the server maximum increase amount and the capacity of the server tank 6W, or may be greater than the difference between the server maximum increase amount and the capacity of the server tank 6W.

In the above-described embodiment, the CPU 51 may omit the second liquid delivery processing. In other words, in the processing at S24, when the server remaining amount is equal to or greater than the server prescribed remaining amount, the CPU 51 may perform the error notification without determining whether or not there is the printer tank 17W in which the printer remaining amount is equal to or less than the printer prescribed remaining amount. When the printer remaining amount is equal to or greater than the printer prescribed remaining amount, and the server remaining amount is equal to or greater than the server prescribed remaining amount, the CPU 51 may perform one or both of the first liquid delivery processing and the circulation processing. In the processing at S22, when the printer remaining amount is equal to or greater than the printer prescribed remaining amount, the CPU 51 may shift the processing to the first liquid delivery processing without performing the determinations at S24 and S32.

In the processing at S40, the CPU 51 need not necessarily identify the minimum printer tank. For example, the CPU 51 may identify the printer tank 17W of the printer 1 that is determined in advance. The CPU 51 may identify the printer tank 17W in which an empty capacity is greatest. The CPU 51 may identify the printer tank 17W having the highest frequency for performing the supply processing.

The CPU 51 may control the supply processing, the first liquid delivery processing, the second liquid delivery processing, the circulation processing, and the like based on the signal from the server sensor 71, or based on the signal from the printer sensor 185. For example, in the circulation processing, in the processing at S61, the CPU 51 may acquire the printer remaining amount from the printer sensor 185, and, in the processing at S62, may store the printer remaining amount in the RAM 53 as the pre-circulation remaining amount. In this case, in the processing at S72, the CPU 51 may acquire the printer remaining amount from the printer sensor 185, and, in the processing at S73, may determine whether or not the printer remaining amount has reached the pre-circulation remaining amount.

In the circulation processing, the CPU 51 may change an execution order of the supply operation (S63 and S65) and the return operation (S71 and S74). For example, the CPU 51 may perform the supply operation after performing the return operation. The CPU 51 may perform the supply operation and the return operation in parallel with each other. The CPU 51 may alternately repeat the supply operation and the return operation.

In the above-described embodiment, when the supply time period has elapsed (yes at S64), the CPU 51 stops the supply operation (S65). In contrast to this, the CPU 51 may stop the supply operation based on an integrated number of rotations of the supply pumps 20 and 21 from when the supply operation is started by the processing at S63, on a change amount of the server remaining amount from when the supply operation is started by the processing at S43, or the like. The CPU 51 may control the supply operation and the return operation based on the printer remaining amount.

In the above-described embodiment, when the server remaining amount has reached the pre-circulation remaining amount (yes at S73), the CPU 51 stops the return operation (S74). In contrast to this, the CPU 51 may stop the return operation based on an integrated number of rotations of the circulation pumps 26 and 27 from when the return operation is started by the processing at S71, on a change amount of the server remaining amount from when the return operation is started by the processing at S71, or the like.

For example, in the first white flow path W1, the liquid supply device 2 may omit one or both of the supply pumps 20 and 21. For example, when both the supply pumps 20 and 21 are omitted, the CPU 51 controls one or both of the supply valves 22 and 23 to be in the open state and the closed state. In this way, the CPU 51 may control the supply of the white ink to the respective printer tanks 17W of the printers 1A and 1B from the server tank 6W using the liquid head difference between the respective printer tanks 17W of the printers 1A and 1B and the server tank 6W.

For example, in the first white flow path W1, the liquid supply device 2 may omit one or both of the circulation pumps 26 and 27. For example, when both the circulation pumps 26 and 27 are omitted, the CPU 51 controls one or both of the circulation valves 28 and 29 to be in the open state and the closed state. In this way, the CPU 51 may control the return of the white ink from the respective printer tanks 17W of the printers 1A and 1B to the server tank 6W using the liquid head difference between the respective printer tanks 17W of the printers 1A and 1B and the server tank 6W.

For example, in the first white flow path W1, the liquid supply device 2 may omit one or both of the supply valves 22 and 23. In the first white flow path W1, the liquid supply device 2 may omit one or both of the circulation valves 28 and 29. In the first white flow path W1, the liquid supply device 2 may omit one or both of the filters 24 and 25.

In the tube 82, for example, the liquid supply device 2 may change an upstream or downstream positional relationship in the supply flow path of the supply pump 20, the supply valve 22, and the filter 24, as appropriate. Similarly, in the tube 83, for example, the liquid supply device 2 may change an upstream or downstream positional relationship in the supply flow path of the supply pump 21, the supply valve 23, and the filter 25, as appropriate.

In the tube 84, for example, the liquid supply device 2 may change an upstream or downstream positional relationship in the circulation flow path of the circulation pump 26 and the circulation valve 28, as appropriate. Similarly, in the tube 85, for example, the liquid supply device 2 may change an upstream or downstream positional relationship in the circulation flow path of the circulation pump 27 and the circulation valve 29, as appropriate.

The single printer 1 may be connected to the single liquid supply device 2 by the tube 8. The two printers 1, three printers 1 or more than five printers 1 may be connected to the single liquid supply device 2 by the tube 8. The liquid supply device 2 may be provided with only the server tank 6W of the plurality of server tanks, and need not necessarily be provided with the other server tanks. In this case, the printer 1 may be provided with only the printer tank 17W for example, of the plurality of printer tanks, and need not necessarily be provided with the other printer tanks. The printer 1 need not necessarily be provided with the other heads.

The liquid supply system 100 may supply a pre-treatment agent, a post-treatment agent, or water, as the liquid, to each of the plurality of printers 1 from the liquid supply device 2. For example, the water may be used for humidifying the atmosphere inside the printer 1. In this case, the plurality of printers 1 may be respectively provided with a humidifier. The humidifier is provided inside the printer 1 and humidifies the atmosphere inside the printer 1. The tube 8 may connect the server tank storing the water and a tank of the humidifier with each other. The main processing may be applied to a flow path of the water instead of, or in addition to, the first white flow path W1 and the second white flow path W2. Similarly, the main processing may be applied to a flow path of the color inks, the pre-treatment agent, or the post-treatment agent, for example.

The configuration of the printer 1 is not limited to that of the above-described embodiment. For example, in the above-described embodiment, the printer 1 may be a type different from the inkjet printer, and may be a laser printer, a tape printer, or the like. The plurality of heads 14 are not limited to the inkjet heads, and may be thermal heads, or the like. The head 14 and the other heads may be a line head. For example, the printer 1 need not necessarily use ink as the liquid, and it is sufficient that the printer 1 be provided with the humidifier. In this case, the liquid supply system 100 supplies the water from the liquid supply device 2 to the humidifier of the printer 1 via the tube 8.

The server sensor 71 may be an optical sensor or an electrode-type level sensor. In this case, the server sensor 71 may detect the server remaining amount by detecting a height of the liquid surface inside the server tank 6W. The server sensor 71 may be a pressure sensor. In this case, the server sensor 71 may detect the server remaining amount by detecting the pressure inside the server tank 6W.

The printer sensor 185 may be a weight sensor. In this case, the printer sensor 185 may detect the printer remaining amount by detecting the weight of the printer remaining amount. The printer sensor 185 may be an optical sensor or an electrode-type level sensor. In this case, the printer sensor 185 may detect the printer remaining amount by detecting a height of the liquid surface inside the printer tank 17W.

A configuration of the number of the tubes 8, a branching format and the like are not limited to those of the above-described embodiment. For example, the server tank 6W may be connected to the printer tank 17W of the single printer 1 via a plurality of (2, for example) the tubes 8 that do not branch. In this case, in the supply operation and the return operation, the white ink flows through each of the different tubes 8. For example, the tube 84 need not necessarily be connected to the tube 82 at the point P2, and may be directly connected to the server tank 6W of the printer 1A. The tube 85 need not necessarily be connected to the tube 84 at the point P4, and may be directly connected to the server tank 6W. The server tank 6W and the printer tank 17W of the single printer 1 may be connected by the single tube 8 that does not branch. In this case, in each of the supply operation and the return operation, the white ink flows through the same tube 8.

In the above-described embodiment, the liquid supply system 100 may change each of execution conditions for the supply processing and execution conditions for the circulation processing. For example, the CPU 51 may execute the supply processing or the circulation processing when the user operates the operation portion 186 or the operation portion 57, and inputs an instruction to execute the supply processing or the circulation processing to the printer 1 or the liquid supply device 2. The CPU 51 may perform the circulation processing at a time determined in advance.

In the above-described embodiment, the liquid supply system 100 may omit the server sensor 71 and the printer sensor 185. In this case, the CPU 51 may store the server remaining amount and the printer remaining amount of an initial state, for example. Furthermore, by performing time control of the pump motors 201, 211, 261, and 271 using the stored server remaining amount or printer remaining amount as a reference, the CPU 51 may determine a current server remaining amount or printer remaining amount.

The CPU 41 may perform the main processing. In this case, the liquid supply system 100 may omit the CPU 51. The CPU 51 may perform a part of the main processing, and the CPU 41 may perform another part of the main processing. A CPU of an external device may perform the main processing. The external device is a device other than the printer 1 and the liquid supply device 2, and is a personal computer (PC), a smartphone, or the like.

In place of the CPU 41 or 51, a microcomputer, application specific integrated circuits (ASICs), a field programmable gate array (FPGA) or the like may be used as a processor. The main processing may be performed as distributed processing by a plurality of the processors. It is sufficient that the non-transitory storage media, such as the ROM 42 or 52, the flash memory 44 or 54, and the like be a storage medium capable of storing information, regardless of a period of storing the information. The non-transitory storage medium need not necessarily include a transitory storage medium (a transmitted signal, for example). The control program may be downloaded from a server connected to a network (not shown in the drawings) (in other words, may be transmitted as transmission signals), and may be stored in the ROM 42 or 52 or the flash memory 44 or 54. In this case, the control program may be stored in a non-transitory storage medium, such as an HDD provided in the server.

What is claimed is:

1. A liquid supply system supplying a liquid to a printer tank, the printer tank being a tank provided in a printer, the liquid supply system comprising:

a tube connecting the printer tank and a server tank configured to store the liquid;

a liquid delivery mechanism provided in the tube, and being configured to perform a supply operation of supplying the liquid from the server tank to the printer tank via the tube, and a return operation of returning the liquid from the printer tank to the server tank via the tube;

a processor; and a memory storing computer-readable instructions that, when executed by the processor, cause the processor to perform processes comprising:

circulation processing of causing the liquid delivery mechanism to perform the supply operation and the return operation; and first liquid delivery processing of, when a remaining amount of the liquid in a first tank, the first tank being one of the server tank or the printer tank, becomes equal to or greater than a first prescribed remaining amount, causing the liquid delivery mechanism to perform a liquid delivery operation before the circulation processing, the liquid delivery operation being the supply operation or the return operation of delivering the liquid from the first tank to a second tank via the tube, the second tank being, of the server tank and the printer tank, different from the first tank.

2. The liquid supply system according to claim 1, wherein the computer-readable instructions instruct the processor to perform a process further comprising:

performing the first liquid delivery processing and the circulation processing in that order, when a circulation condition for performing the circulation processing is satisfied, and the remaining amount of the liquid in the first tank when the circulation condition is satisfied is equal to or greater than the first prescribed remaining amount.

3. The liquid supply system according to claim 1, wherein the first prescribed remaining amount is less than a difference between a capacity of the first tank and a maximum increase amount, and the maximum increase amount is a difference between the remaining amount of the liquid in the first tank at a start of the circulation processing and a maximum remaining amount of the liquid in the first tank in a period from the start to an end of the circulation processing.

4. The liquid supply system according to claim 1, wherein an amount of the liquid delivered from the first tank to the second tank via the tube by the liquid delivery operation by the first liquid delivery processing is greater than a maximum increase amount, and the maximum increase amount is a difference between the remaining amount of the liquid in the first tank at a start of the circulation processing and a maximum remaining amount of the liquid in the first tank in a period from the start to an end of the circulation processing.

5. The liquid supply system according to claim 1, wherein the computer-readable instructions instruct the processor to perform a process further comprising:

prohibition processing of prohibiting the first liquid delivery processing and the circulation processing from being performed, when the remaining amount of the liquid in the first tank is equal to or greater than the first prescribed remaining amount and a remaining amount of the liquid in the second tank is equal to or greater than a second prescribed remaining amount.

6. The liquid supply system according to claim 1, wherein the printer includes a plurality of printers including a target printer and other printer, the other printer being different from the target printer, the first tank is the printer tank, and includes a first printer tank provided in the target printer and a second printer tank provided in the other printer, the second tank is the server tank, and the computer-readable instructions instruct the processor to perform a process further comprising:

performing second liquid delivery processing of, when a remaining amount of the liquid in the first printer tank is equal to or greater than the first prescribed remaining amount and a remaining amount of the liquid in the server tank is equal to or greater than a second prescribed remaining amount, causing the liquid delivery mechanism to perform the supply operation, before the first liquid delivery processing, of supplying the liquid from the server tank to the second printer tank via the tube until a remaining amount of the liquid in the server tank becomes less than the second prescribed remaining amount.

7. The liquid supply system according to claim 6, wherein the plurality of printers are three or more of the printers, the other printer is two or more of the printers, the second printer tank includes a plurality of the second printer tanks provided in each of the other printers, and the computer-readable instructions instruct the processor to perform a process further comprising:

in the second liquid delivery processing, causing the liquid delivery mechanism to perform the supply operation of supplying the liquid from the server tank to a minimum printer tank via the tube, the minimum printer tank being, of the plurality of the second printer tanks, a tank having a least remaining amount of the liquid.

8. A control method by a liquid supply system supplying a liquid to a printer tank, the printer tank being a tank provided in a printer, the liquid supply system including a tube and a liquid delivery mechanism, the tube connecting the printer tank and a server tank configured to store the liquid, the liquid delivery mechanism being provided in the tube, the liquid delivery mechanism being configured to perform a supply operation of supplying the liquid from the server tank to the printer tank via the tube, and a return operation of returning the liquid from the printer tank to the server tank via the tube, the control method comprising:

circulation processing of causing the liquid delivery mechanism to perform the supply operation and the return operation; and first liquid delivery processing of, when a remaining amount of the liquid in a first tank, the first tank being one of the server tank or the printer tank, becomes equal to or greater than a first prescribed remaining amount, causing the liquid delivery mechanism to perform a liquid delivery operation before the circulation processing, the liquid delivery operation being the supply operation or the return operation of delivering the liquid from the first tank to a second tank via the tube, the second tank being, of the server tank and the printer tank, different from the first tank.

9. A non-transitory computer-readable medium storing computer-readable instructions executed by a computer of a liquid supply system supplying a liquid to a printer tank, the printer tank being a tank provided in a printer, the liquid supply system including a tube and a liquid delivery mechanism, the tube connecting the printer tank and a server tank configured to store the liquid, the liquid delivery mechanism being provided in the tube, the liquid delivery mechanism being configured to perform a supply operation of supplying the liquid from the server tank to the printer tank via the tube, and a return operation of returning the liquid from the printer tank to the server tank via the tube, the instructions, when executed by the computer, causing the computer to perform processes comprising:

circulation processing of causing the liquid delivery mechanism to perform the supply operation and the return operation; and first liquid delivery processing of, when a remaining amount of the liquid in a first tank, the first tank being one of the server tank or the printer tank, becomes equal to or greater than a first prescribed remaining amount, causing the liquid delivery mechanism to perform a liquid delivery operation before the circulation processing, the liquid delivery operation being the supply operation or the return operation of delivering the liquid from the first tank to a second tank via the tube, the second tank being, of the server tank and the printer tank, different from the first tank.

10. A liquid supply device supplying a liquid to a printer tank, the printer tank being a tank provided in a printer, the liquid supply device comprising:

a tube connecting the printer tank and a server tank configured to store the liquid;

a liquid delivery mechanism provided in the tube, and being configured to perform a supply operation of supplying the liquid from the server tank to the printer tank via the tube, and a return operation of returning the liquid from the printer tank to the server tank via the tube;

a processor; and a memory storing computer-readable instructions that, when executed by the processor, cause the processor to perform processes comprising:

circulation processing of causing the liquid delivery mechanism to perform the supply operation and the return operation; and first liquid delivery processing of, when a remaining amount of the liquid in a first tank, the first tank being one of the server tank or the printer tank, becomes equal to or greater than a first prescribed remaining amount, causing the liquid delivery mechanism to perform a liquid delivery operation before the circulation processing, the liquid delivery operation being the supply operation or the return operation of delivering the liquid from the first tank to a second tank via the tube, the second tank being, of the server tank and the printer tank, different from the first tank.

* * * * *